(12) United States Patent
Mah

(10) Patent No.: US 6,729,744 B2
(45) Date of Patent: May 4, 2004

(54) FARADAY FLASHLIGHT

(76) Inventor: Pat Y. Mah, 8C Leroy Plaza, 15 Cheung Shun Street, Cheung Sha Wan, Kowloon, Hong Kong (CN)

( * ) Notice: Subject to any disclaimer, the term of this patent is extended or adjusted under 35 U.S.C. 154(b) by 113 days.

(21) Appl. No.: 10/112,848

(22) Filed: Mar. 29, 2002

(65) Prior Publication Data

US 2003/0185000 A1 Oct. 2, 2003

(51) Int. Cl.[7] .................................................. F21L 13/06
(52) U.S. Cl. ....................................... 362/192; 362/202
(58) Field of Search ................................ 362/192, 193, 362/205, 202

(56) References Cited

U.S. PATENT DOCUMENTS

| | | | |
|---|---|---|---|
| 1,184,056 A | * 5/1916 | Van Deventer | |
| 3,100,292 A | 1/1960 | Warner | 310/15 |
| 3,129,347 A | 7/1960 | Tognola | |
| 3,149,254 A | 9/1964 | Carter | |
| 3,453,573 A | 4/1966 | Kyle | |
| 3,696,251 A | 10/1972 | Last et al. | 290/53 |
| 3,736,448 A | 5/1973 | Hebel, Jr. | 310/15 |
| 3,933,535 A | 1/1976 | Becker | 148/103 |
| 3,984,707 A | 10/1976 | McClintock | 310/15 |
| 4,114,305 A | 9/1978 | Wohlert et al. | 310/15 |
| 4,140,932 A | 2/1979 | Wohlert | 315/15 X |
| 4,605,994 A | 8/1986 | Krieg | 362/202 |
| 4,680,682 A | 7/1987 | Parker | 362/158 |
| 4,709,176 A | 11/1987 | Ridley et al. | 310/15 |
| 4,777,582 A | 10/1988 | Sharrah | 362/205 |
| 4,803,605 A | 2/1989 | Schaller et al. | 362/205 |
| 4,870,550 A | 9/1989 | Uke | 362/158 |
| 5,008,575 A | 4/1994 | Maglica | 362/183 |
| 5,347,186 A | 9/1994 | Konotchick | 310/17 |
| 5,578,877 A | 11/1996 | Tiemann | 310/15 |
| 5,975,714 A | * 11/1999 | Vetorino et al. | 362/192 |
| 6,220,719 B1 | * 4/2001 | Vetorino et al. | 362/192 |

FOREIGN PATENT DOCUMENTS

| | | |
|---|---|---|
| JP | 5129781 | 3/1976 |
| JP | 5105902 | 8/1980 |
| JP | 8113202 | 8/1983 |
| JP | 9-82104 | 2/1991 |

OTHER PUBLICATIONS

News group thread (Jan. 11–26, 1996) Sci. Electronics.Basics Sci. Electronics, Sci.Electronics.Misc, Sci.Electronics.Equipment.

* cited by examiner

Primary Examiner—Laura K. Tso
(74) Attorney, Agent, or Firm—Curtis L. Harrington

(57) ABSTRACT

A light generating device utilizes a large centrally located magnet which is mounted to slide past a magnet pickup or current induction wire which may be preferably mounted at a center point of travel in a tubular housing having a tubular chamber through which the magnet travels. A pair of elastomeric bumpers are located each at the end of the tubular chamber which may be inside or outside the flashlight. The result is a device which both facilitates the manual movement of the flashlight body so that the magnet slides past the center magnet pickup or current induction wire, and also conserves the residual momentum of the magnet once it has traveled past the magnet pickup or current induction wire by providing a bumper and spring to conserve some of the mechanical energy going in the other direction. Ninety second of manual activation enables about five minutes of illumination.

10 Claims, 2 Drawing Sheets

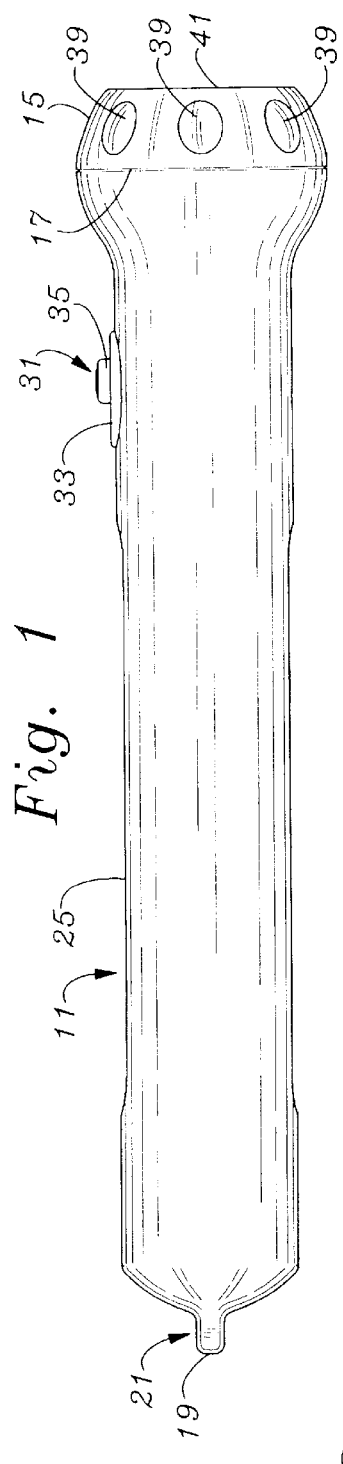
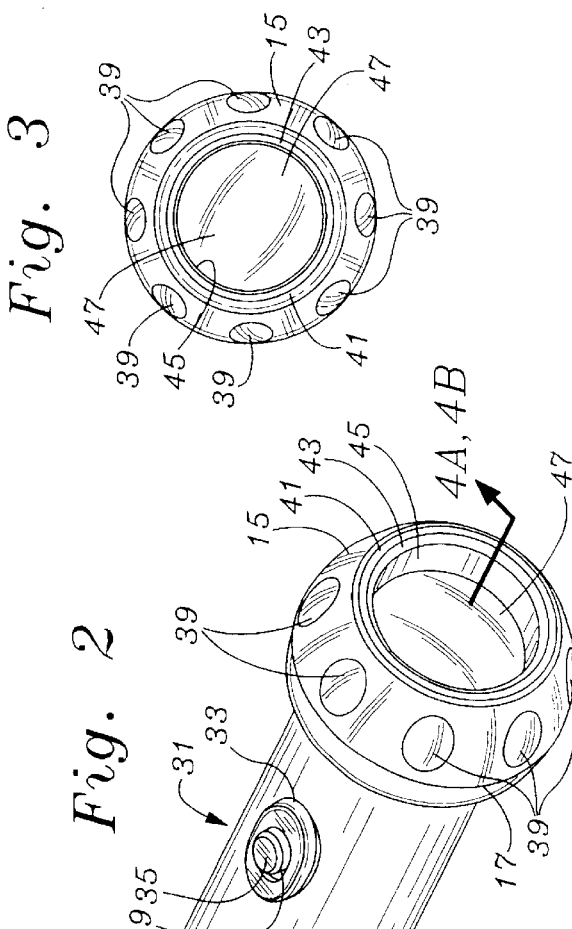
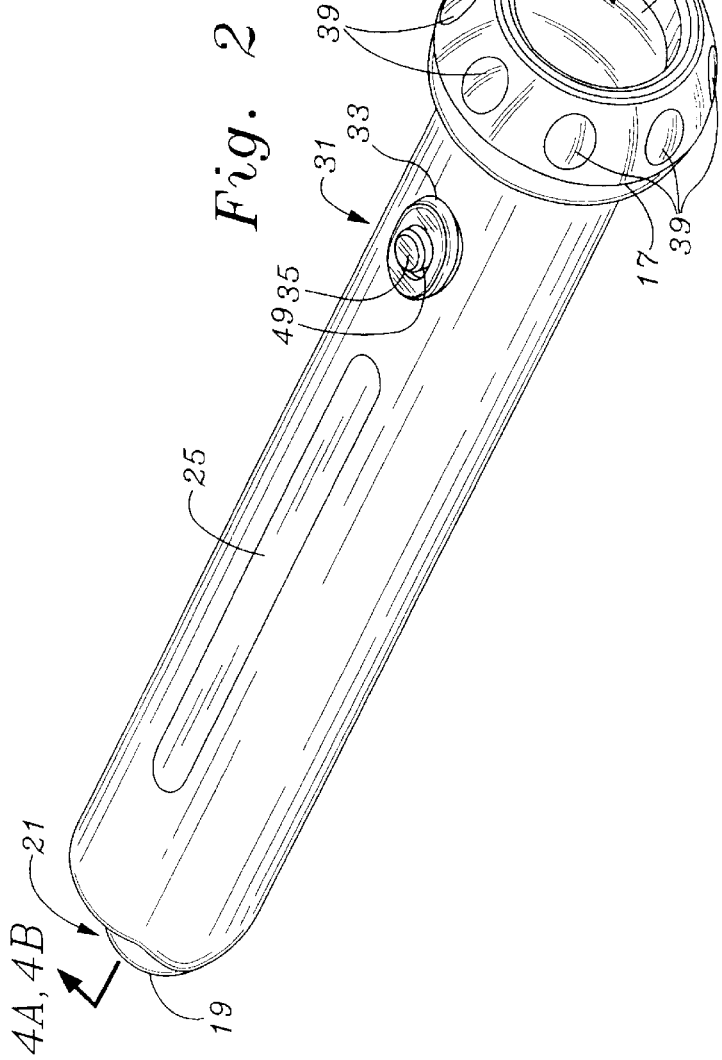

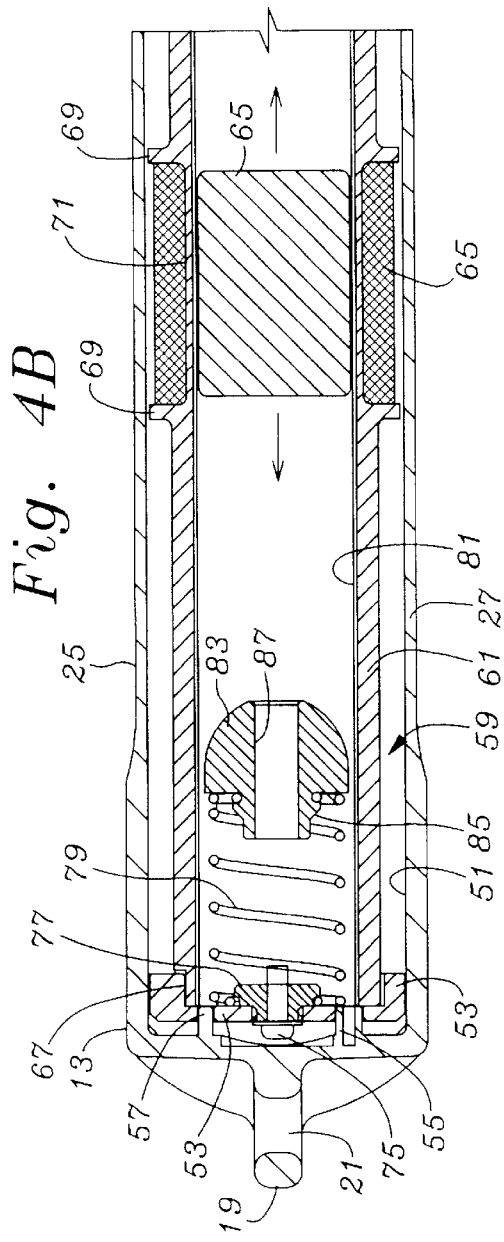

FARADAY FLASHLIGHT

FIELD OF THE INVENTION

The present invention relates to improvements in the technology relating to inexpensive and reliable lighting sources and more particularly to a human powered flashlight free of batteries and free of external integrity breaches and which is engineered to use light efficiently.

BACKGROUND OF THE INVENTION

Production of light with a portable light source or flashlight is a well known expedient in which a tubular body is fitted with a number of series connected batteries. The disadvantages of conventional flashlights with this conventional configuration are generally (1) breach of internal external integrity from having to access the battery compartment fairly regularly to replace batteries, and (2) other breaches of external integrity associated with light bulb changes at the front of the device and from a mechanical linkage relating to the on and off switch.

In some devices especially built for underwater use, a series of multiple "o" rings may be employed for water sealing.

However, when these structures are employed at points likely to be repeatedly accessed, such as the rear entrance to the battery compartment, degradation will likely occur resulting in an eventual breach of sealing integrity.

Other step have been taken to insure integrity such as placing a flexible push button cover over the on and off switch, but these covers tend to either leak early in their functional life at the ring of circular attachment, or later in their functional life by cracking or punching breach. Seals around the bulb changing entrance, typically the front lens cover have proven to be more secure.

Production of energy for lighting using generator devices are also known. In some cases a crank generator is provided with the crank extending through the housing, creating another source of housing fluid breach. Either a scientifically closely toleranced bearing must be provided to keep moisture out (close tolerance along with friction loss) or the generator must itself be water proof. The generator is itself a complex mechanical machine and also prone to water damage, rust, and excessive wear.

Because of the breakdowns cited above, non-battery flashlights are generally unreliable as an emergency or long storage time period source of lighting, and particularly in a harsh or moist environment.

Further, the majority of personal lighting products are generally inefficient as being operated using an incandescent (heated filament) light source which is not conserving of energy usage per unit of illumination. Most generator models require considerable hand crank input to effect any significant light output over time.

What is therefore needed is a more compact, more isolated source of emergency lighting which is human powered, but which is also efficient in operation. The device should be impact resistant and have relatively few moving parts and no intense, high force, small area wear surfaces.

SUMMARY OF THE INVENTION

The light generating device of the present invention utilizes a large centrally located magnet which is mounted to slide past a magnet pickup or current induction wire which may be preferably mounted at a center point of travel in a tubular housing having a tubular chamber through which the magnet travels. A pair of elastomeric bumpers are located each at the end of the tubular chamber. Each of the elastomeric bumpers are supported by its own spring secured against the sides, end or both of the terminal ends of the tubular chamber. The mounting sequence is first chamber end or structure to first spring, to first bumper to freely slidable or translatable magnet to second bumper secured by second end or structure of the chamber. The result is a device which both facilitates the manual movement of the flashlight body so that the magnet slides past the center magnet pickup or current induction wire, and also conserves the residual momentum of the magnet once it has traveled past the magnet pickup or current induction wire by providing a bumper and spring to conserve some of the mechanical energy going in the other direction.

Where the size of the magnet is matched to the length of the tubular chamber and the size of the springs, a matched, sealed mechanical system is formed which can be continuously operated with minimal wrist energy. The mechanical input energy is intended to be stored regardless of whether the light is operational during charging or not. The energy consumption of the lamp should be such that the mechanical charging action can keep sufficient energy stored in advance of its consumption in light production so that the flashlight of the invention can be continued to be utilized even when any temporary store of energy provided is depleted. This action is contemplated to be performed by shaking the flashlight several times to input mechanical and then electrical energy into storage, followed by a period of illumination from an energy reservoir, which may be chemical or capacitor or other.

In addition, an activation switch for external control is had with an external smaller magnet which operates in conjunction with a reed switch to enable mechanical activation without the necessity to form a mechanical linkage between the inside and outside of the flashlight.

BRIEF DESCRIPTION OF THE DRAWINGS

The invention, its configuration, construction, and operation will be best further described in the following detailed description, taken in conjunction with the accompanying drawings in which:

FIG. 1 is a side view of the Faraday flashlight of the present invention;

FIG. 2 is a perspective view of the Faraday flashlight as seen in FIG. 1 looking toward the front end;

FIG. 3 is a front view of the Faraday flashlight seen in FIGS. 1 and 2; and

FIGS. 4A and 4B are expanded views of a section taken along line 4A and 4B of FIG. 2.

DETAILED DESCRIPTION OF THE PREFERRED EMBODIMENT

The description and operation of the invention will be best initiated with reference to FIG. 1 and which illustrates a Faraday flashlight which will hereinafter be referred to as a flashlight 11. The external appearance of the flashlight 11 discloses two portions, a main housing chamber 13 portion and a front cap 15 portion which is separated from the main housing chamber 13 portion by a dividing line 17. Front cap 15 portion may include a combination or unitary clear cap which includes a threaded engagement portion and integral lens. In the version shown in the figures, a lens will be shown to be separate from the engagement portion of the cap, but this is just one possible variation. At the rear of the main housing chamber 13 is a protruding lug 19 having an opening 21 which is not immediately visible in FIG. 2, but which is indicated by arrow. An upper flattened portion 25 and a lower flattened portion 27 are seen in FIG. 2. An expanded portion 29 of the main housing chamber 13 is seen as meeting front cap 15 at the dividing line 17.

At the top of the flashlight 11 an attached switch assembly 31 is seen as having an attached saddle 33 which overlies the cylindrical outer surface and a slide member 35 which has retaining members (not shown in FIG. 1) which fit within the saddle 33. The whole of the switch assembly 31 may be mounted to the main housing chamber 13 by gluing, fusion, or the like. Switch assembly 35 acts by virtue of movement of a magnet within slide member 35 to a point over a portion of the housing chamber 13 at which a reed switch (not shown in FIG. 1) is located, and in order to close the reed switch by proximity of such magnet. It should be noted that the orientation of the flashlight 11 is such that the internals are protected from water and moisture, including the magnet wire 63 and magnet 65. However, it is contemplated that the magnet 65 could be made to be external to the main housing chamber 13, while the magnet wire 63 may be internally or externally located. Further, rather than simple movement of a straight tubular shaped main housing chamber 13, the movement of the magnet 65 could be effected by other mechanical and configurational structure.

As will be seen, the portion of main housing chamber 13 over which the saddle 33 is positioned may provide an accommodation space or depression to better accommodate saddle 33 and especially to protect its becoming dislodged upon external applied force, especially force along the main housing chamber 13.

The front cap 15 is shown as being supplied with a series of indentations 39 which provide not only a decorative effect, but approximate a spacing for finger and hand manipulation. The flashlight 11 is intended to be waterproof, shockproof, and to generally never need servicing as it lacks any sort of bulb which could burn out. It uses a light emitting diode which is shockproof and is not generally expected to be changed. Indentations 39 may also assist machine placement of the front cap 15 consistently to a pre-determined torque in order to provide maximum sealing while minimizing the chance of overrunning the threads of attachment. Also seen is an end surface 41.

Referring to FIG. 2, a perspective view of the flashlight 11 as seen in FIG. 1, but looking toward the front end, illustrates further details within the cap 15. Just within cap 15, and beyond the end surface 41 is an angled surface 43. Just beyond angled surface 43 is an inner cylindrical surface 45. Adjacent the inner cylindrical surface 45 is a curved lens 47. As will be seen, sealing will occur behind the curved lens 47 and the arrangement of structures is such that any moisture or water which enters the dividing space or dividing line 17 still must negotiate the seal behind the curved lens 47 in order to have an opportunity to further invade the inner workings of flashlight 11. Also seen immediately to the rear of slide member 35 is a slide space 49 which defines the limits over which the slide member 35 may travel. In the configuration of FIG. 2 this is seen as allowing a forward and rearward motion along the main housing chamber 13 body, but an arrangement for side to side movement can be made.

Referring to FIG. 3, a front view of the Faraday flashlight 11 seen in FIGS. 1 and 2 illustrates the orientation of structures already covered in detail, as well as the visual effect of a main housing chamber 13 having an expanded portion 29.

Referring to FIGS. 4A and 4B, expanded views of a sectional view taken along line 4A and 4B of FIG. 2 are shown. Beginning at the end of the main housing chamber 13 closest the protruding lug 19, and adjacent an internal surface 51 of the main housing chamber 13, a centering sleeve 53 is supported by projections 55 and 57. The centering sleeve 53 supports a magnet wire and magnet support assembly 59 which includes a magnet translation support sleeve 61 supporting 1600 turns of magnet wire 63 at a position approximate the center of travel of a magnet 65 which is mounted to freely axially slidably move within the magnet translation support sleeve 61. The term "magnet wire" is utilized only to indicate that this wire is intended to have induced currents due to the movement of a magnet.

The end of magnet translation support sleeve 61 nearest the centering sleeve 53 includes a circumferentially outwardly directed groove 67 to enable it to fit within and be seated against the centering sleeve 53. Near the center of the magnet translation support sleeve 61, a pair of spaced apart lands 69 are provided to both stabilize the magnet translation support sleeve 61 against the internal surface 51 of the main housing chamber 13, and to provide a defined annularly radial volume for the magnet wire 63. In the case shown in FIG. 4B, this volume includes a portion of the external surface of magnet translation support sleeve 61 shown with numeral 71 which has a smaller cylindrical radius to accommodate slightly more volume of the magnet wire 63, but this need not be the case in every design.

At a portion of the magnet translation support sleeve 61 opposite the circumferentially outwardly directed groove 67, a radial land 73 is provided for stabilizing the magnet translation support sleeve 61 against the internal surface 51 of the main housing chamber 13.

Within and near the end of the magnet translation support sleeve 61 near the centering sleeve 53 a screw 75 secures a spring retainer 77 to the centering sleeve 53. The spring retainer 77 further secures a rear spring 79, at a first end of rear spring 79, and within the magnet translation support sleeve 61, preferably in a manner that it will not contact or rub against an inner surface 81 of the magnet translation support sleeve 61. A second end of the spring 79 is attached to a damper 83 by its rearwardly extending boss 85 around a central bore 87.

Within and near the end of the magnet translation support sleeve 61 near the radial land 73 a screw 75 secures a spring retainer 77 to an end wall 89 of the magnet translation support sleeve 61. The spring retainer 77 further secures a front spring 91, at a first end of front spring 91, and within the magnet translation support sleeve 61, also preferably in a manner that it will not contact or rub against an inner surface 81 of the magnet translation support sleeve 61. A second end of the front spring 91 is attached to a second damper 83 by its rearwardly extending boss 85 around a central bore 87.

As is further shown, the magnet translation support sleeve 61 is not seen to end at the radial land 73, but continues with a web portion 95 leading to a support 97 for supporting a gold capacitor 101 which may preferably be commercially available from Panasonic EECF5R5U105 and may have a value of up to one farad and is limited only by the limitations desired for energy storage capacity. Gold Capacitor 101 provides the energy storage for powering the flashlight 11. Support 97 may continue with a wall 103, as well as a wall which would be present to obstruct the view of FIG. 4A, but which is removed in order to see the sectional view of FIG. 4A. A divider 105 is seen located over the gold capacitor 101. Above the divider 105 a reed switch bracket 107 supports one or more lengths of tape 109 for spacing a reed switch 111. The reed switch 111 is underneath a position occupied by the forward most translation of slide member 35. A small magnet 115 is shown within the slide member 35 and in a position over and just to the side of the reed switch 111. Small magnet 115 is utilized to cause the reed switch 111 to close when the slide 35 is in its forward position. FIG. 4A also illustrates the depth of an external indentation 117 in the main housing chamber 13 which accommodates the small magnet underneath the slide 35 which translates within the attached saddle 33. When the slide 35 and small magnet 115 are brought rearwardly within the saddle 33 and away from the reed switch 111, the reed switch 111 will open to interrupt any lighting circuit present.

Forward of the support 97, a further support 121 connects the support 97 to a reflector housing 123. At the rear of the reflector housing a light emitting diode 125 may be connected to circuitry 126. Circuitry 126 will provide rectification of the alternating currents produced with the magnet wire 63 and magnet 65 for each travel length of the magnet 65. Light emitting diode 125 is concentrically mounted within the reflector housing 123 and surrounded by a reflector material 127. The inner cylindrical surface of reflector housing 123 may also be reflectorized. Just ahead of the reflector housing 123, the internal surface 51 of the main housing chamber includes a groove 131 which is concentrically larger than internal surface 51. Groove 131 has a radial surface width to fit an "o" ring 135. Groove 131 has an axial depth to accommodate both the "o" ring 135 and about half the thickness of the lens 47. The lens 47 is forced in place by the rearward projection of a butt end 137 of the inner cylindrical member 139 of which the inner cylindrical surface 45 was previously seen. As also can be seen, a mating space 141 is immediately adjacent the lens 47 and between the main housing chamber 13 and the front cap 15. The mating space 141 leads to a threaded interface including an outer set of threads 143 on the main housing chamber 13 and an inner set of threads 145 on the front cap 15. The other side of the threaded interface is in communication with the dividing line 17.

Note that any moisture or water must gain admittance in one of two paths. One path is through the dividing line 17, thence through the threaded interface between outer set of threads 143 and inner set of threads 145 on the front cap 15 and to the edge of the lens 47. The other path is between the outer periphery of the front face of the lens 47 and the continuous butt end 137 of the inner cylindrical member 139 of the front cap 15.

In order to enter the inside of the main housing chamber 13, moisture must either go past the sealed barrier between the "o" ring 135 and the groove 131, or between the "o" ring 135 and the periphery of a rear face 147 of the lens 47.

First, it is clear that the flashlight 111 can be provided with varying capacity members. For example, the magnet 65 has been found to work well utilizing a diameter size of about nineteen millimeters and a length of about 28 millimeters. The field strength of the magnet 65 will depend upon the material used. Variations might include the use of two magnets 65 separated by a plastic interconnect. In this configuration, the magnets would excite the magnet wire 63 twice for each tilt of the main housing chamber 13. Ideally, the pair of magnets 65 could be reverse polarized so that one tilt would be equivalent to two tilts with one magnet. Three or four magnets could be joined together to give four actuations of the magnet wire 63 for each tilt of the flashlight 11.

Conversely, multiple numbers of sections of the magnet wire 63 could be provided. Two sections of magnet wire 63 would produce twice the energy per tilt or travel of the magnet 65 from one end of the magnet translation support sleeve 61 to the other. Again, the strength of the springs 79 and 91, combined with the hardness of the dampers 83 and the weight of the magnet 65 (or magnets 65) will determine the natural frequency of shaking for activation of the flashlight 11. Further, where the magnet translation support sleeve 61 is made from nearly frictionless material and where the magnets 65 are made from a material complementary to the frictionless material of the magnet translation support sleeve 61, very little energy from friction will be consumed and the bulk of the reverse magnetic EMF force will predominate as resistance to shaking the flashlight 11. Insofar as any resistance from air entrapment within the magnet translation support sleeve 61, this can be vitiated by providing alternative routes for air to pass. Alternate routes can be accomplished by providing a core in the magnet 65, or by providing side slots along the side edges of magnet 65, or by providing long ribs along the inside of the magnet translation support sleeve 61 to provide a reduced surface wear area as well as spacing for displacement air to pass, or the magnet translation support sleeve 61 itself could be provided with ventilation holes to allow air to pass in the space between the an outer surface 149 of magnet translation support sleeve 61 and internal surface 51 of the main housing chamber 13, for example.

Given the fact that the stored energy in the flashlight 11 is accomplished with a high efficiency gold capacitor 101, the storage capability of the gold capacitor can be enlarged by utilizing either more capacitors 101 in parallel, or a larger capacitor 101. Unlike storage batteries, a capacitor 101 will not suffer deleterious effects from being charged for long periods of time. Capacitors may have some leakage or some rating based upon inadvertent leakage, but regardless of this factor, there is no negative effects from keeping a constant charge. As such, the flashlight 11 is ideal for storage in a horizontal position in locations subject to movement. For example, storage under the seat of a truck laterally will result in movement of the magnet 65 from one end of the magnet translation support sleeve 61 each time an alternative corner is turned. In more specialized structures, such as upon surfaces that turn slowly, the mounting of the flashlight 11 will provide a continuous charge. In machinery which undergoes significant shaking in a predominant direction, the flashlight 11 could also be mounted. The mounting method may vary, but any mounting external magnets should be located away from both the path of travel of the magnet 65. In all of these cases, the flashlight 11 will automatically be available for use in a fully charged condition.

Utilizing the structures described, it is expected that the resulting flashlight 11 could be manually shaken back and forth at approximately one movement per half second, for a total 90 seconds to make enough energy to power the light emitting diode 125 for about 5 minutes. The light output is preferably and deliberately low at about 6000 lux in order that the cycle time enable a user to have the ability "stay ahead" of the energy utilization time. In the example of a ninety second shake for about five minutes of illumination, and depending upon the capacity of the components, it will be preferable to perform the shaking at a time when the light emitting diode 125 is switched off via the switch assembly 31. In emergency circumstances, the user who performs shaking with the light emitting diode 125 on, will experience a lesser cycle time and a jumpy light show. If the components were set to a vigorous ninety second shake followed by five minutes of operation, if the shaking occurred while the flashlight 11 was on, the five minutes would be reduced to about three and a half minutes.

While the present invention has been described in terms of a flash light not needing incandescent bulbs or batteries, and more particularly to particular structures which are both sealed and manually powered lighting device, the principles contained therein are applicable to other instruments, devices, processes and structures in which sealed, water proof, and underwater lighting can be provided.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A flashlight comprising:

a magnet having a magnetic field;

main housing having a first end and a second end for supporting a translating movement of said magnet toward said first end and toward said second end of said main housing;

a magnet wire positioned such that said magnet passes by said magnet wire each time said magnet makes said translating movement of said magnet toward said first end and toward said second end of said main housing, energizing said magnet wire from passage of said magnetic field through said magnet wire upon said translating movement of said magnet;

a capacitor for storing an electrical charge;

a light emitting diode;

circuitry connected to said capacitor, said light emitting diode and to said magnet wire for converting said energization of said magnet wire into an electrical charge stored in said capacitor and for providing said electrical charge stored in said capacitor to power said light emitting diode;

a first spring having a first end anchored to said main housing, and a second end;

a first damper attached to said second end of said first spring to receive direct force from said magnet;

a second spring having a first end anchored to said main housing, and a second end;

a second damper attached to said second end of said second spring to receive direct force from said magnet.

2. The flashlight as recited in claim 1 wherein said main housing further comprises an annularly cylindrical main housing having an opening and front cap attached to said annularly cylindrical main housing.

3. The flashlight as recited in claim 2 wherein said annularly cylindrical main chamber has a groove adjacent said opening and further comprising an "o" ring forming a seal between said groove and said front cap.

4. The flashlight as recited in claim 3 wherein said annularly cylindrical main housing has an outwardly disposed thread adjacent said opening and wherein said front cap further comprises:

a threaded structure having a central opening about an inwardly directed cylindrical surface terminating at a circular butt end, and having an inwardly disposed thread complementary to said outwardly disposed thread; and a front transparent light transmissive material adjacent said central opening and interposed between said circular butt end and said "o" ring supported by said groove adjacent said opening.

5. The flashlight as recited in claim 4 wherein said front transparent light transmissive material is a lens for directing a set of light rays from said light emitting diode.

6. The flashlight as recited in claim 1 and further comprising a magnet translation support sleeve within said main housing for providing translation containment for said magnet and for providing support for said magnet wire.

7. The flashlight as recited in claim 6 and further comprising a support for supporting said capacitor and connected to said magnet translation support sleeve.

8. The flashlight as recited in claim 7 and further comprising a reflector housing for supporting said light emitting diode and connected to said support for supporting said capacitor.

9. The flashlight as recited in claim 1 and further comprising a switch interposed between said connection of said capacitor and said light emitting diode for controllably controlling the energization of said light emitting diode.

10. The flashlight as recited in claim 9 wherein said switch interposed between said connection of said capacitor and said light emitting diode is a reed switch operated by a small switching magnet on an outside of said main housing.

* * * * *